US012736730B2

(12) United States Patent
Wi et al.

(10) Patent No.: US 12,736,730 B2
(45) Date of Patent: Sep. 15, 2026

(54) POLARIZING PLATE AND OPTICAL DISPLAY APPARATUS

(71) Applicant: SAMSUNG SDI CO., LTD., Yongin-si (KR)

(72) Inventors: Ji Hyun Wi, Suwon-si (KR); Eun Mi Kim, Suwon-si (KR); A Ra Jo, Suwon-si (KR); Min Jeong Park, Suwon-si (KR); Han Su Kim, Suwon-si (KR)

(73) Assignee: HOARDSUN HENGXIN(WUXI) MATERIALS CO., LTD., Wuxi (CN)

( * ) Notice: Subject to any disclaimer, the term of this patent is extended or adjusted under 35 U.S.C. 154(b) by 287 days.

(21) Appl. No.: 18/603,928

(22) Filed: Mar. 13, 2024

(65) Prior Publication Data

US 2024/0319425 A1 Sep. 26, 2024

(30) Foreign Application Priority Data

Mar. 21, 2023 (KR) ........................ 10-2023-0036374

(51) Int. Cl.
*G02B 5/30* (2006.01)
*G02F 1/1335* (2006.01)

(52) U.S. Cl.
CPC ..... *G02B 5/3025* (2013.01); *G02F 1/133531* (2021.01)

(58) Field of Classification Search
None
See application file for complete search history.

(56) References Cited

U.S. PATENT DOCUMENTS

2007/0184212 A1* 8/2007 Nimura ................ G02B 5/3033 428/1.31
2007/0268587 A1* 11/2007 Ninomiya ............... G02B 1/111 359/601
2010/0134879 A1* 6/2010 Yoshihara ............. B32B 27/285 359/361
2010/0231830 A1* 9/2010 Hirakata .............. G02B 5/0242 349/96
2011/0080645 A1* 4/2011 Tsuno .................... G02B 1/118 356/600
2012/0147304 A1 6/2012 Yanai et al.
(Continued)

FOREIGN PATENT DOCUMENTS

CN 101074996 A 11/2007
CN 101669050 3/2010
(Continued)

OTHER PUBLICATIONS

Taiwanese Office Action dated Jan. 20, 2025, issued in corresponding Taiwanese Patent Application No. 113109087 (6 pages).

*Primary Examiner* — Robert E. Tallman
(74) *Attorney, Agent, or Firm* — Ricky Lam

(57) ABSTRACT

A polarizing plate and an optical display apparatus are disclosed. A polarizing plate includes a polarizer and a protective film stacked on a light exit surface of the polarizer, and the protective film includes a polyester based base layer and an antiglare layer stacked on a surface of the polyester based base layer, and the protective film has an in-plane retardation of 100 nm to 4,000 nm at a wavelength of 550 nm, a total haze of 40% to 80%, and a ratio of internal haze to external haze of greater than 0 to 0.2.

13 Claims, 5 Drawing Sheets

(56) References Cited

U.S. PATENT DOCUMENTS

| | | | |
|---|---|---|---|
| 2021/0032478 | A1 | 2/2021 | Lee et al. |
| 2021/0116605 | A1 | 4/2021 | Kim et al. |
| 2023/0163265 | A1 | 5/2023 | Lee et al. |

FOREIGN PATENT DOCUMENTS

| | | | |
|---|---|---|---|
| CN | 102870039 | A | 1/2013 |
| CN | 104422982 | A | 3/2015 |
| CN | 104640695 | A | 5/2015 |
| CN | 111601710 | A | 8/2020 |
| CN | 113631962 | A | 11/2021 |
| CN | 115104045 | | 9/2022 |
| KR | 10-2120989 | B1 | 6/2020 |
| TW | I712826 | B | 12/2020 |

* cited by examiner

POLARIZING PLATE AND OPTICAL DISPLAY APPARATUS

CROSS-REFERENCE TO RELATED APPLICATION

The present application claims priority to and the benefit of Korean Patent Application No. 10-2023-0036374, filed on Mar. 21, 2023 in the Korean Intellectual Property Office, the entire disclosure of which is incorporated herein by reference.

BACKGROUND

1. Field

Aspects of embodiments of the present invention relate to a polarizing plate and an optical display apparatus.

2. Description of the Related Art

In general, a polarizing plate is manufactured by bonding protective films to both sides of a polarizer formed by adsorbing/aligning dichroic pigments on a polyvinyl alcohol (PVA) based film. The protective film mainly serves to protect the polarizer which is mechanically vulnerable. The protective film is stretched to provide a function of compensating for viewing angle through suitable phase difference.

In recent years, with ultra-enlargement of TVs and activation of open cell businesses, low moisture permeability materials, for example, PET, PMMA, and the like, have been widely used instead of triacetylcellulose (TAC) series films that have been conventionally used as upper protective films to improve durability of polarizing plates, specifically reliability of the polarizing plates under a high humidity environment. In particular, the use of polarizing plates formed of PET films with good mechanical properties and low moisture permeability is increasing.

The background technique of the present invention is disclosed in Korean Patent Registration No. 10-2120989.

SUMMARY

According to an aspect of embodiments of the present invention, a polarizing plate improving rainbow stains is provided.

According to another aspect of embodiments of the present invention, a polarizing plate having a luminance improvement effect when stacked on a panel for an optical display apparatus is provided.

According to an aspect of one or more embodiments of the present invention, a polarizing plate is provided.

According to one or more embodiments, a polarizing plate includes: a polarizer; and a protective film stacked on a light exit surface of the polarizer, wherein the protective film includes a polyester based base layer and an antiglare layer stacked on a surface of the polyester based base layer, and wherein the protective film has an in-plane retardation of 100 nm to 4,000 nm at a wavelength of 550 nm, a total haze of 40% to 80%, and a haze ratio of internal haze to external haze of greater than 0 to 0.2.

According to another aspect of one or more embodiments of the present invention, an optical display apparatus is provided.

According to one or more embodiments, an optical display apparatus includes the polarizing plate according to an embodiment of the present invention.

The present invention provides a polarizing plate improving rainbow stains.

The present invention provides a polarizing plate having a luminance improvement effect when stacked on a panel for an optical display apparatus.

DETAILED DESCRIPTION

Figure 1:
FIG. 1 is a cross-sectional view of a polarizing plate according to an embodiment of the present invention.

Herein, some example embodiments of the present invention will be described in further detail with reference to the accompanying drawings such that the present invention can be implemented by a person having ordinary knowledge in the art. However, it is to be understood that the present invention may be embodied in different ways and is not limited to the following embodiments.

The terminology used herein is for the purpose of describing example embodiments and is not intended to limit the present invention. As used herein, the singular forms "a," "an," and "the" are intended to include the plural forms as well, unless the context clearly indicates otherwise.

Herein, "in-plane retardation Re," "out-of-plane retardation Rth," and "degree of biaxiality NZ" are represented by the following Equations A, B, and C, respectively:

$$Re=(nx-ny)\times d, \quad \text{(A)};$$

$$Rth=((nx+ny)/2-nz)\times d, \quad \text{(B)};$$

$$NZ=(nx-nz)/(nx-ny), \quad \text{(C)},$$

where nx, ny, and nz are indexes of refraction of an optical device in the slow axis direction, the fast axis direction, and the thickness direction of the optical device at a wavelength of 550 nm, respectively, and d is the thickness of the optical device (unit: nm). Here, the slow axis refers to an axis of the optical device having a high index of refraction, and the fast axis refers to an axis of the optical device having a low index of refraction in an in-plane direction thereof.

Herein, "reflectance" refers to a value measured for a polarizing plate and means the specific component included (SCI) reflectance. SCI reflectance may be measured by a typical method known to those skilled in the art.

Herein, "internal haze" is measured on a protective film in the same manner as in measurement of total haze of the protective film after alcohol, for example, ethanol, is sprayed onto a glass plate having a total haze of less than 1%, followed by adhering a coating surface of the protective film (that is, an antiglare layer or a low refractivity layer of the protective film) to the glass plate to flatten irregularities of the coating surface. The total haze of the protective film may be measured using a typical haze meter.

Herein, "external haze" may be a difference between the total haze of the protective film and the internal haze thereof (total haze of the protective film-internal haze of the protective film).

Herein, "haze" may be measured in the visible spectrum, for example, at a wavelength of 380 nm to 780 nm.

Herein, "index of refraction" may be measured in the visible spectrum, for example, at a wavelength of 550 nm.

Herein, the term "(meth)acryl" refers to acryl and/or methacryl.

Herein, "solid content" means a remaining component excluding a solvent.

As used herein to represent a specific numerical range, the expression "X to Y" means "greater than or equal to X and less than or equal to Y (X≤ and ≤Y)".

A polarizing plate according to embodiments of the present invention has a rainbow stain improvement effect even with a protective film having a lower range of in-plane retardation than a typical ultra-retardation film (generally having an in-plane retardation of greater than 4,000 nm to 30,000 nm). The polarizing plate according to the present invention has a luminance improvement effect when stacked on a panel for an optical display apparatus.

According to one or more embodiments of the present invention, a polarizing plate includes: a polarizer; and a protective film stacked on a light exit surface of the polarizer, wherein the protective film includes a polyester based base layer and an antiglare layer stacked on a surface of the polyester based base layer, and wherein the protective film has an in-plane retardation of 100 nm to 4,000 nm at a wavelength of 550 nm, a total haze of 40% to 80%, and a haze ratio of internal haze to external haze of greater than 0 to 0.2.

In an embodiment, the polarizing plate may be used as a viewer side polarizing plate.

Herein, a polarizing plate according to an embodiment of the present invention will be described in further detail.

Protective Film

The protective film may be stacked on a light exit surface of the polarizer to allow light emitted from the polarizer to be emitted outside therethrough. As used herein, "light exit surface" may be a surface through which light emitted from a backlight unit having entered a panel for an optical display apparatus and the polarizer is emitted, when the polarizing plate is stacked on the panel.

The protective film includes a polyester based base layer. In an embodiment, the polyester based base layer may be formed of polyethylene terephthalate, polyethylene naphthalate, polybutylene terephthalate, polybutylene naphthalate, or the like. In an embodiment, the polyester based base layer may be formed of polyethylene terephthalate.

In an embodiment, the polyester based base layer may have a thickness of 40 μm to 100 μm, for example, 60 μm to 90 μm. Within this range, the polyester based base layer can act as a support for the protective film.

The polyester based base layer has lower moisture permeability than typical triacetylcellulose films and thus can improve reliability of the polarizing plate. However, since the polyester based base layer has optical anisotropy due to inherent birefringence, the polyester based base layer allows rainbow stains to be visible. Therefore, in-plane retardation of the protective film may be significantly increased to 5,000 nm or more to prevent or substantially prevent rainbow stains from being visible. However, the range of in-plane retardation that prevents or substantially prevents rainbow stains from being visible is limited to 5,000 nm or more. In addition, since a non-stretched protective film is stretched to a high stretching ratio in order to increase in-plane retardation of the protective film, it is necessary to take into account a possibility of film fracture, an angular relationship between axes of the protective film with respect to a light absorption axis of the polarizer, and the like. However, the present invention provides an effect of preventing rainbow stains from being visible even with a polyester based base layer having relatively low in-plane retardation.

In one or more embodiments of the present invention, the protective film has an in-plane retardation of 100 nm to 4,000 nm at a wavelength of 550 nm. For example, the protective film may have an in-plane retardation of 100 nm, 200 nm, 300 nm, 400 nm, 500 nm, 600 nm, 700 nm, 800 nm, 900 nm, 1,000 nm, 1,100 nm, 1,200 nm, 1,300 nm, 1,400 nm, 1,500 nm, 1,600 nm, 1,700 nm, 1,800 nm, 1,900 nm, 2,000 nm, 2,100 nm, 2,200 nm, 2,300 nm, 2,400 nm, 2,500 nm, 2,600 nm, 2,700 nm, 2,800 nm, 2,900 nm, 3,000 nm, 3,100 nm, 3,200 nm, 3,300 nm, 3,400 nm, 3,500 nm, 3,600 nm, 3,700 nm, 3,800 nm, 3,900 nm, or 4,000 nm. In an embodiment, the protective film may have an in-plane retardation of 150 nm to 3,000 nm, 200 nm to 2,600 nm, or 500 nm to 2,600 nm. Within this range, there can be no possibility of film breakage or the like upon film fabrication.

In an embodiment, the protective film may have an out-of-plane retardation of 10,000 nm or less at a wavelength of 550 nm, for example, 1,000 nm, 2,000 nm, 3,000 nm, 4,000 nm, 5,000 nm, 6,000 nm, 7,000 nm, 8,000 nm, or 9,000 nm, and, in an embodiment, 1,000 m to 9,000 nm, and, in an embodiment, 2,000 nm to 8,000 nm. Within this range, the above in-plane retardation of the protective film can be easily achieved and the effects the present invention can be further improved.

In an embodiment, the protective film may have a degree of biaxiality at a wavelength of 550 nm of 1.0 or more, for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, and, in an embodiment, 1.1 to 3.0, or 1.2 to 2.0. Within this range, the above in-plane retardation of the protective film can be easily achieved and the advantageous effect of the present invention can be further improved.

The protective film, for example, a polyester based base layer, may be prepared by biaxial stretching to realize the above in-plane retardation. In an example, the protective film may be prepared by preparing a non-stretched film for the protective film and biaxially stretching the non-stretched film in the machine direction (MD) and the traverse direction (TD), respectively. The biaxially stretched protective film can easily achieve the in-plane retardation of the protective film and can easily realize the effects of the present invention. The protective film has an in-plane slow axis and fast axis, and the effect of the present invention can be easily realized by adjusting an angle between the light absorption axis of the polarizer (MD of the polarizer) and the in-plane slow axis of the protective film. In an embodiment, the in-plane slow axis of the protective film (that is, the polyester base layer) may be tilted at an angle of −40° to +40° with respect to the light absorption axis (0°) of the polarizer. When indicating an angle, "+" means the clockwise direction and "−" means the counterclockwise direction with respect to a reference (e.g., the light absorption axis of the polarizer).

The non-stretched film for the protective film may be prepared by processing a composition for the protective film by melt extrusion or solution casting. The composition for the protective film may include a polymer resin, such as polyethylene terephthalate, polyethylene naphthalate, polybutylene terephthalate, polybutylene naphthalate, or the like. The polymer resin may be a commercially available product or may be prepared by a typical method known to those skilled in the art. The composition may further include additives and the like. Melt extrusion and solution casting may be performed by a typical method known to those skilled in the art.

Biaxial stretching includes a process of biaxially stretching the non-stretched film for the protective film in the MD and TD of the non-stretched film. Biaxial stretching may be performed in the sequence of MD uniaxial stretching followed by TD uniaxial stretching, or TD uniaxial stretching followed by MD uniaxial stretching. The stretching ratio may be suitably selected by taking into account the thickness of the non-stretched film, target in-plane retardation, and/or the stretching temperature. For example, a primary stretching ratio may be 1.1 to 5 times, a secondary stretching ratio may be 1.1 to 5 times, and a total stretching ratio may be 2 to 6 times as the product of the primary and secondary stretching ratios. The stretching temperature may be adjusted according to the glass transition temperature (Tg) of the non-stretched film, for example, Tg±20° C. Stretching may be performed by any typical method known to those skilled in the art and may be performed by dry stretching and/or wet stretching.

The protective film may be manufactured by biaxially stretching a laminate having an antiglare layer formed on a surface of a non-stretched film for the polyester base layer in the method described above, or by biaxially stretching a non-stretched film for the polyester base layer to form the polyester base layer, followed by forming an antiglare layer thereon.

The polyester based base layer has an in-plane retardation of 100 nm to 4,000 nm at a wavelength of 550 nm. In an embodiment, the polyester based base layer may have an in-plane retardation of 150 nm to 3,000 nm, 200 nm to 2,600 nm, or 500 to 2,600 nm. Within this range, there can be no possibility of film breakage or the like upon film fabrication.

In an embodiment, the polyester based base layer may have an out-of-plane retardation of 10,000 nm or less at a wavelength of 550 nm, and, in an embodiment, 1,000 nm to 9,000 nm, and, in an embodiment, 2,000 nm to 8,000 nm. Within this range, the in-plane retardation of the protective film can be easily achieved and the effect of the present invention can be further improved.

The polyester based base layer may have a degree of biaxiality at a wavelength of 550 nm of 1.0 or more, and, in an embodiment, 1.1 to 3.0, or 1.2 to 2.0. Within this range, the in-plane retardation can be easily achieved and the effect of the present invention can be further improved.

By adjusting total haze of the protective film having the above in-plane retardation range at a wavelength of 550 nm and the ratio of internal haze to external haze thereof, the present invention provides effects of preventing (preventing or substantially preventing) rainbow stains from being visible and improving luminance in application of a polarizing plate including a protective film with the above in-plane retardation. In particular, the present invention can prevent (prevent or substantially prevent) rainbow stains from being visible and improve luminance in application of a polarizing plate including a protective film with high external haze.

The protective film has a total haze of 40% to 80% and a haze ratio of internal haze to external haze of greater than 0 to 0.2.

If the total haze of the protective film is less than 40%, the protective film can provide severe rainbow stains. If the total haze of the protective film is greater than 80%, the protective film can provide poor luminance. For example, the protective film may have a total haze of 40%, 45%, 50%, 55%, 60%, 65%, 70%, 75%, or 80%, for example, 40% to 75%, or 45% to 75%.

If the ratio of internal haze to external haze of the protective film is 0, the protective film can provide severe rainbow stains. If the ratio of internal haze to external haze of the protective film is greater than 0.2, the protective film can provide severe rainbow stain or significant poor luminance. For example, the ratio may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2, and, in an embodiment, 0.03 to 0.2, 0.03 to 0.17, or 0.03 to 0.1.

The protective film may have an external haze of 20% or more to less than 80%, and, in an embodiment, 20% to 75%, and, in an embodiment, 20% to 70%, 30% to 70%, or 50% to 75%. Within this range, the above haze ranges can be easily achieved.

The protective film may have an internal haze of 10% or less, and, in an embodiment, greater than 0% to 10%, and, in an embodiment, 1% to 10%, 1.5% to 10%, 2% to 6%, or 2.5% to 6%. Within this range, the above ratio range can be easily achieved.

The total haze, external haze and internal haze of the protective film may be realized by the antiglare layer. The polyester based base layer may have a total haze, internal haze, and external haze of each 1% or less, for example, 0% to 0.5%. Within this range, the internal haze and external haze of the protective film may not be affected.

The antiglare layer is directly formed on the polyester based base layer. Here, "directly formed" means that the polyester based base layer and the antiglare layer are directly stacked on each other without an adhesive layer, a bonding layer, an adhesive-bonding layer, or any other optical layer therebetween. The antiglare layer may be formed by directly coating and curing a composition for the antiglare layer on the polyester based base layer.

In an embodiment, the above total haze, external haze, and/or internal haze of the antiglare layer may be realized by forming fine irregularities on the outermost surface thereof.

In an embodiment, fine irregularities may be accomplished by a method of forming irregularities on the outermost surface of the antiglare layer without beads in the antiglare layer and/or by a method of placing particles, such as beads, in the antiglare layer.

The method of forming irregularities on the outermost surface of the antiglare layer may be performed by a typical method known to those skilled in the art. For example, the antiglare layer may be formed by applying a composition for the antiglare layer to a surface of an adherend or the polyester based base layer to form a coating, applying the coating to a mold formed with irregularities, and curing the coating. Here, the total haze and/or the internal haze of the protective film according to the present invention may be adjusted by adjusting any of the height of the irregularities, the cross-sectional shape of the irregularities, the distance between the irregularities, the height difference between the irregularities, and the like.

The method of placing particles, such as beads, in the antiglare layer may be performed by a typical method known to those skilled in the art. For example, the antiglare layer may be formed by preparing the composition for the antiglare layer containing organic particles, and applying the prepared composition to a surface of an adherend or the polyester base layer to form a coating, followed by curing the coating.

The organic particles are contained in the composition for the antiglare layer, have a different index of refraction from a matrix for the antiglare layer to allow control of haze of the protective film, and provide surface roughness in a certain range (e.g., a predetermined range), thereby improving the effects of the present invention.

In an embodiment, the organic particles may be present in an amount of 5 wt % to 50 wt %, and, in an embodiment, 10 wt % to 40 wt %, and, in an embodiment, 10 wt % to 20 wt %, in the antiglare layer. Within this range, the antiglare layer can have an antiglare effect.

The organic particles may be any of microparticles, nanoparticles, and the like, and may have any suitable shape, such as any of a spherical shape, an amorphous shape, and the like, and an average particle diameter (D50) of 0.01 μm to 6 μm. Within this range, the antiglare layer can provide an antiglare effect. The organic particles are contained in the composition including a resin for the antiglare layer and, in an embodiment, have an average particle diameter (D50) of 0.5 μm to 5.5 μm, and, in an embodiment, 1 μm to 5 μm, for formation of the antiglare layer.

As used herein, "average particle diameter (D50)" means a typical average particle size (D50) known to those skilled in the art and means a particle diameter of the organic particles corresponding to 50 vol % when the organic particles are distributed in order from smallest to largest in terms of volume.

In an embodiment, the organic particles may include a mixture of at least two types of organic particles having different average particle diameters (D50). For example, the organic particles may include first organic particles and second organic particles having a different, and, in an embodiment, smaller, average particle diameter (D50) than the first organic particles. For example, the organic particles may include first organic particles having an average particle diameter (D50) of 1 μm to 5 μm, and, in an embodiment, 2 μm to 5 μm, and second organic particles having an average particle diameter (D50) of 0.01 μm to 4 μm, and, in an embodiment, 0.5 μm to 3 μm.

In an embodiment, the first organic particles may be present in an amount of 1 wt % to 30 wt %, and, in an embodiment, 2 wt % to 20 wt %, and, in an embodiment, 2 wt % to 5 wt %, in the antiglare layer, and the second organic particle may be present in an amount of 1 wt % to 60 wt %, and, in an embodiment, 2 wt % to 50%, and, in an embodiment, 10 wt % to 20 wt %, in the antiglare layer. Within these ranges, the antiglare layer according to the present invention can be easily obtained.

The organic particles have a higher index of refraction than the matrix for the antiglare layer and may have an index of refraction of 1.30 to 1.70, and, in an embodiment, 1.40 to 1.70, or 1.40 to 1.60. Within this range, the antiglare layer according to the present invention can be easily obtained.

In an embodiment, the organic particles may be a mixture of organic particles having different indexes of refraction. For example, the organic particles may include a mixture of first organic particles and second organic particles, wherein the first organic particles have a lower index of refraction than the second organic particles. For example, the first organic particles may have an index of refraction of 1.55 or less, for example, 1.40 to 1.55, and the second organic particles may have an index of refraction of greater than 1.55, for example, greater than 1.55 to 1.65.

The organic particles may be suitably selected from organic particles having an index of refraction as described above.

For example, although the organic particles may include core-shell type organic particles, the organic particles, in an embodiment, are non-core-shell type organic particles, that is, organic particles composed of a single material. The single material for the organic particles may be polyacrylate based particles, polymethacrylate based particles including poly(methyl methacrylate) (PMMA) and the like, polystyrene (PS) based particles, silicone based particles, polycarbonate based particles, polyolefin based particles, polyester based particles, polyamide based particles, polyimide based particles, polyfluoroethylene based particles, poly(methyl methacrylate)-polyacrylate based particles, polyacrylate-polystyrene based particles, melamine based particles, or the like. In an embodiment, the organic particles are a mixture of polystyrene based particles and polyacrylate or polymethacrylate based particles.

In an embodiment, the antiglare layer may consist of the matrix for the antiglare layer with no organic particles. In another embodiment, the antiglare layer may include the organic particles and the matrix for the antiglare layer in which the organic particles are dispersed.

The matrix for the antiglare layer may be formed of a composition including an actinic radiation curable compound. The actinic radiation curable compound may include an actinic radiation curable resin or oligomer and/or an actinic radiation curable monomer.

The actinic radiation curable resin or oligomer refers to a compound that is crosslinked and cured by actinic radiation, for example, ultraviolet or electron rays. The actinic radiation curable resin or oligomer may be an acrylic, urethane, polyester, epoxy, epoxy (meth)acrylate, urethane (meth)acrylate resin or oligomer, or the like. In an embodiment, the actinic radiation curable resin or oligomer is a urethane (meth)acrylate resin or oligomer, and, in an embodiment, a multifunctional urethane (meth)acrylate resin or oligomer.

The actinic radiation curable monomer refers to a monomer that is crosslinked and cured by actinic radiation, for example, ultraviolet or electron rays. The actinic radiation-curable monomer can increase the curing rate of the composition while increasing the degree of dispersion of the organic particles. For example, the actinic radiation curable monomer may be a 2- to 10-functional, for example, 2- to 6-functional, (meth)acrylate. The 2- to 10-functional (meth)acrylate may be selected from any type known to those skilled in the art. For example, the actinic radiation-curable monomer may include a bifunctional acrylate, such as 1,6-hexanediol di(meth)acrylate, neopentyl glycol di(meth)acrylate, polyethylene glycol di(meth)acrylate, neopentyl glycol adipate di(meth)acrylate, and the like; a trifunctional (meth)acrylate, such as trimethylolpropane tri(meth)acrylate, dipentaerythritol tri(meth)acrylate, pentaerythritol tri(meth)acrylate, propylene oxide modified trimethylolpropane tri(meth)acrylate, and the like; a tetrafunctional acrylate, such as diglycerin tetra(meth)acrylate, pentaerythritol tetra(meth)acrylate, and the like; a pentafunctional acrylate, such as dipentaerythritol penta(meth)acrylate and the like; and a hexafunctional acrylate, such as dipentaerythritol hexa(meth)acrylate, caprolactone-modified dipentaerythritol hexa(meth)acrylate, a reaction product of urethane (meth)acrylate (for example, isocyanate monomer) and trimethylolpropane tri(meth)acrylate, and the like, without being limited thereto.

The composition may further include at least one photoinitiator selected from among a photoradical initiator or a photo-cationic initiator. The photoinitiator can cure the actinic radiation curable resin and the actinic radiation curable monomer. The photoradical initiator may include a photoradical initiator, such as an acetophenone photoradical initiator, a cyclohexylketone photoradical initiator, and the like.

In an embodiment, the composition may include 5 wt % to 50 wt %, and, in an embodiment, 10 wt % to 40 wt %, and, in an embodiment, 10 wt % to 20 wt %, of the organic particles; 20 wt % to 80 wt %, and, in an embodiment, 50 wt % to 70 wt %, of the actinic radiation curable resin or oligomer; 10 wt % to 80 wt %, and, in an embodiment, 10 wt % to 30 wt %, of the actinic radiation curable monomer; and 1 wt % to 10 wt % of the photoinitiator in terms of solid content.

The composition for the antiglare layer may include any suitable solvent selected within the range that does not dissolve the organic particles. The solvent may be any of methyl ethyl ketone, propylene glycol methyl ether, and the like, without being limited thereto.

The composition for the antiglare layer may further include typical additives for antiglare layers. The additives may include, for example, any of dispersants, pigments, antistatic agents, surface modifiers, and the like, without being limited thereto.

The antiglare layer may be formed by applying the composition for the antiglare layer to a surface of the polyester base layer, followed by drying and curing the composition. Curing may be performed by a typical method known to those skilled in the art, for example, thermal curing, light curing, and the like.

In an embodiment, the antiglare layer may have a thickness of 2 μm to 10 μm, and, in an embodiment, 3 μm to 7 μm. Within this range, the antiglare layer may be formed in the protective film.

Polarizer

The polarizer is a linear light absorption type polarizer and has a function of polarizing incident light by transmitting fractions of the light traveling in a first direction and absorbing fractions of the light traveling in a direction perpendicular to the first direction.

The polarizer may be a polyvinyl alcohol (PVA) based polarizer prepared by dyeing and stretching a polyvinyl alcohol (PVA) based film, or a polyene based polarizer prepared by dehydrating a polyvinyl alcohol (PVA) based film.

In an embodiment, the polarizer may have a thickness of 50 μm or less, for example, 5 μm to 30 μm. Within this range, there may be no melting and fracture of the film when stretching the film.

The protective film may further include a low refractivity layer stacked on a surface of the antiglare layer.

Low Refractivity Layer

The low refractivity layer has a lower index of refraction than the antiglare layer. As a result, the low refractivity layer can solve a problem of deterioration in luminance due to high haze caused by the antiglare layer in application of the polarizing plate.

The low refractivity layer lowers reflectivity of the protective film or the polarizing plate and does not affect the optical properties of the protective film including the polyester base layer and the antiglare layer.

In an embodiment, the low refractivity layer may be an antireflective layer, a low reflectivity layer, or an ultra-low reflectivity layer. As a result, a problem of high haze due to the antiglare layer causing deterioration in luminance can be addressed. Accordingly, the polarizing plate may have an SCI reflectance of 5% or less, for example, 0% to 5%, or greater than 0% to 5%. Within this range, the polarizing plate can prevent or substantially prevent deterioration in surface quality due to external light.

The low refractivity layer may be directly formed on the antiglare layer. Here, "directly formed" means that the antiglare layer and the low refractivity layer are directly stacked on each other without an adhesive layer, a bonding layer, an adhesive-bonding layer, or any other optical layer therebetween. The low refractivity layer may be formed by directly coating and curing a composition for the low refractivity layer on the antiglare layer.

The composition for the low refractivity layer may include inorganic particles and/or a fluorine compound. The inorganic particles and the fluorine compound can lower the index of refraction of the low refractivity layer.

The inorganic particles may be hollow particles to reduce the index of refraction of the low refractivity layer. For example, hollow silica may be used as the inorganic particles having a low index of refraction. In an embodiment, the inorganic particles may have an index of refraction of less than 1.5, for example, 1.0 to less than 1.5. Within this range, the inorganic particles can reduce the index of refraction of the low refractivity layer.

The inorganic particles may have a smaller average particle diameter (D50) than the thickness of the low refractivity layer to be included in the low refractivity layer. In an embodiment, the inorganic particles may have an average particle diameter (D50) of 50 nm to 150 nm, for example, 50 nm to 120 nm.

In an embodiment, the inorganic particles may be present in an amount of 30 wt % to 70 wt %, for example, 40 wt % to 60 wt %, or 50 wt % to 60 wt %, in the low refractivity layer. Within this range, the reflectance of the present invention can be readily achieved.

The fluorine compound can facilitate reduction of the index of refraction of the low refractivity layer, even when a small amount of the inorganic particles is used. The fluorine compound may include a fluorine-containing (meth)acrylate monomer, an oligomer thereof, or a resin thereof.

The composition for the low refractivity layer may further include an actinic radiation curable resin or oligomer and/or an actinic radiation curable monomer, and a photoinitiator in addition to the inorganic particles and the fluorine compound. The actinic radiation curable resin and the actinic radiation curable monomer can be cured to facilitate formation of a matrix of the low refractivity layer and to ensure that the particles having a low index of refraction are stably included in the low refractivity layer.

The actinic radiation curable resin, the actinic radiation curable monomer, and the photoinitiator may be substantially the same as those described above for the antiglare layer.

In an embodiment, the composition for the low refractivity layer may include 20 wt % to 80 wt % of at least one of the actinic radiation curable resin, the actinic radiation curable oligomer, and the actinic radiation curable monomer; 30 wt % to 70 wt %, and, in an embodiment, 50 wt % to 70 wt %, of the inorganic particles; 1 wt % to 10% of the fluorine compound; and 1 wt % to 10% of the photoinitiator in terms of solid content. Within this range, the low refractivity layer of the present invention can be easily obtained.

The composition for the low refractivity layer may include any suitable solvent selected within the range that does not dissolve the inorganic particles. The solvent may be any of methyl ethyl ketone, propylene glycol methyl ether, and the like, without being limited thereto.

The composition for the low refractivity layer may further include typical additives. For example, the typical additives may be used to provide anti-fouling properties and slimness to the low refractivity layer. The additives may include a fluorine-containing additive and/or a silicone-based additive.

The low refractivity layer may be formed by applying the composition for the low refractivity layer to a surface of the antiglare layer, followed by drying and curing the composition. Curing may be performed by a typical method known to those skilled in the art, for example, thermal curing, light curing, and the like.

In an embodiment, the low refractivity layer may have a thickness of 60 nm to 200 nm, and, in an embodiment, 80 nm to 150 nm. Within this range, the low refractivity layer can be included in the protective film.

The protective film may be manufactured by biaxially stretching a laminate in which the antiglare layer and the low refractivity layer are sequentially formed on a surface of the non-stretched film for the polyester base layer, or by biaxially stretching the non-stretched film for the polyester base layer to produce the polyester base layer and sequentially forming the antiglare layer and the low refractivity layer thereon.

The polarizing plate may further include a protective film on a light incidence surface of the polarizer. The aforementioned protective film stacked on the light exit surface of the polarizer may be referred to as a “first protective film” and the protective film stacked on the light incidence surface of the polarizer may be referred to as a “second protective film.”

Second Protective Film

The second protective film may be provided to the polarizing plate to protect the polarizer or to increase mechanical strength of the polarizing plate.

The second protective film may include a transparent substrate. The transparent substrate may include an optically transparent resin film having a light incidence surface and a light exit surface opposite the light incidence surface. The transparent substrate may be composed of a single layer of resin film or multiple layers of resin film. The resin may include at least one selected from among a cellulose ester resin including triacetylcellulose (TAC) and the like, a cyclic polyolefin resin including amorphous cyclic polyolefin (COP) and the like, a polycarbonate resin, a polyester resin including polyethylene terephthalate (PET) and the like, a polyethersulfone resin, a polysulfone resin, a polyamide resin, a polyimide resin, a non-cyclic polyolefin resin, a polyacrylate resin including a poly(methyl methacrylate) resin and the like, a polyvinyl alcohol resin, a polyvinyl chloride resin, and a polyvinylidene chloride resin, without being limited thereto.

The transparent substrate may have a haze of 30% or less, and, in an embodiment, 2% to 30%, and a light transmittance of 90% or more, and, in an embodiment, 95% to 100%. Within this range, the transparent substrate can be applied to a polarizing plate.

In an embodiment, the transparent substrate may have a thickness of 5 μm to 200 μm, for example, 30 μm to 120 μm. Within this range, the transparent substrate can be used in a polarizing plate.

The second protective film may be an isotropic film and may have substantially no in-plane retardation. For example, the second protective film may have an in-plane retardation of 10 nm or less, for example, 0 nm to 10 nm, at a wavelength of 550 nm.

The second protective film may have a certain range (e.g., a predetermined range) of in-plane retardation at a wavelength of 550 nm to provide additional functions when combined with the polarizing plate. In an example, the second protective film may have an in-plane retardation of 1,000 nm or less, for example, 0 nm to 1,000 nm, for example, 10 nm to 500 nm, at a wavelength of 550 nm.

Figure 2:
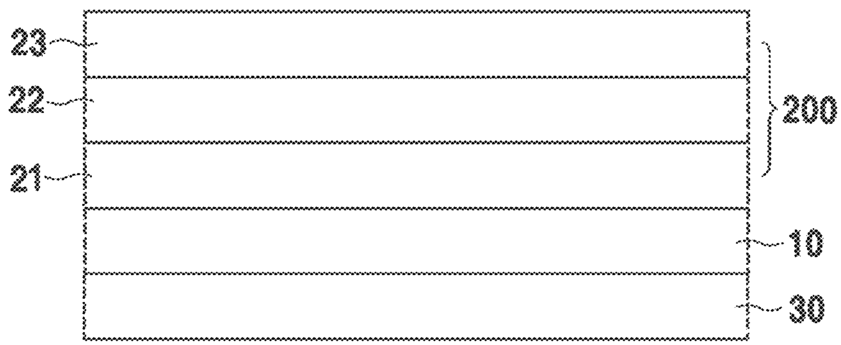
FIG. 2 is a cross-sectional view of a polarizing plate according to another embodiment of the present invention.

FIG. 1 and FIG. 2 are cross-sectional views of polarizing plates according to embodiments of the present invention.

Referring to FIG. 1, a polarizing plate according to an embodiment includes a polarizer 10, a first protective film 20 stacked on a light exit surface of the polarizer 10, and a second protective film 30 stacked on a light incidence surface of the polarizer 10, wherein the first protective film 20 may include a polyester base layer 21 and an antiglare layer 22 sequentially stacked on the light exit surface of the polarizer 10.

Referring to FIG. 2, a polarizing plate according to another embodiment includes a polarizer 10, a first protective film 200 stacked on a light exit surface of the polarizer 10, and a second protective film 30 stacked on a light incidence surface of the polarizer 10, wherein the first protective film 200 may include a polyester base layer 21, an antiglare layer 22, and a low refractivity layer 23 sequentially stacked on the light exit surface of the polarizer 10.

In the polarizing plate, the layers may be stacked one above another by an adhesive layer or a bonding layer, as needed.

An optical display apparatus according to one or more embodiments of the present invention includes the polarizing plate according to an embodiment of the present invention.

The optical display apparatus may be a liquid crystal display, a light emitting device display, or the like, without being limited thereto.

In an embodiment, the optical display apparatus according to the present invention may include the polarizing plate according to an embodiment of the present invention as a viewer side polarizing plate with respect to a liquid crystal panel. The “viewer side polarizing plate” is a polarizing plate disposed at a screen side with respect to the liquid crystal panel, that is, opposite to a light source side.

In an embodiment, a liquid crystal display apparatus may include a light collecting backlight unit, a light source-side polarizing plate, a liquid crystal panel, and a viewer-side polarizing plate sequentially stacked one above another, in which the viewer side polarizing plate may include the polarizing plate according to an embodiment of the present invention. The “light source-side polarizing plate” is a polarizing plate disposed at the light source side. The liquid crystal panel may adopt a VA (vertical alignment) mode, an IPS mode, a PVA (patterned vertical alignment) mode, or an S-PVA (super-patterned vertical alignment) mode, without being limited thereto.

Next, the present invention will be described in further detail with reference to some examples. However, it is to be understood that these examples are provided for illustration and are not to be construed in any way as limiting the present invention.

Example 1

In terms of solid content, 60 parts by weight of a polyfunctional urethane acrylate oligomer (UP111, Entis Co., Ltd.), 18 parts by weight of pentaerythritol triacrylate, 3 parts by weight of poly(methyl methacrylate) (PMMA) organic particles (average particle diameter (D50): 3 μm to 5 μm, index of refraction: 1.50, SSX-105, Sekisui Co., Ltd.), 13 parts by weight of polystyrene (PS) organic particles (average particle diameter (D50): 1 μm to 3 μm, index of refraction: 1.57 to 1.59, SX-130H, Soken Co., Ltd.), and 6 parts by weight of a photoinitiator (1-hydroxy-cyclohexylphenylketone, Irgacure-184, BASF) were mixed.

As a solvent, 110 parts by weight of methyl ethyl ketone and 100 parts by weight of propylene glycol methyl ether were added to the mixture, which in turn was uniformly mixed to prepare a composition for an antiglare layer.

In terms of solid content, 40 parts by weight of pentaerythritol triacrylate, 41 parts by weight of hollow silica particles (average particle diameter (D50): 50 nm to 120 nm, JGC Catalyst & Chemicals Co., Ltd.), 1.0 part by weight of a fluorine-based compound (RS-537, DIC), and 3 parts by weight of a photoinitiator (1-hydroxy-cyclohexylphenylketone) were mixed, and 70 parts by weight of methyl ethyl ketone was added as a solvent to the mixture, which in turn was uniformly mixed to prepare a composition for a low refractivity layer.

A polyvinyl alcohol based film (TS45, Kuraray Co., Ltd.) was uniaxially stretched to 3 times an initial thickness thereof in the MD direction of the film at 60° C., and iodine was adsorbed to the film, which in turn was stretched to 6 times in an aqueous solution of boric acid having a temperature of 40° C., thereby preparing a 23 μm thick polarizer.

A cyclic olefin polymer (COP) based film (Zeon Co., Ltd.) was bonded to a lower surface of the polarizer (corresponding to a light incidence surface of the polarizer) with a UV-curable bonding agent. A protective film with in-plane retardation and haze at a wavelength of 550 nm as listed in Table 1 below was bonded to an upper surface of the polarizer (corresponding to a light exit surface of the polarizer) with a UV-curable bonding agent, thereby preparing a polarizing plate in which the protective film, the polarizer and the cyclic olefin polymer film are sequentially stacked in the stated order.

Examples 2 to 5

Polarizing plates were prepared in the same manner as in Example 1 except that the content of each component was changed in preparation of the compositions for the antiglare layer and the low refractivity layer, and the protective film stacked on the light exit surface of the polarizer was changed to a protective film having in-plane retardation at a wavelength of 550 nm, as listed in Table 1.

Comparative Examples 1 to 4

Polarizing plates were prepared in the same manner as in Example 1 except that the content of each component was changed in preparation of the composition for the antiglare layer and the protective film stacked on the light exit surface of the polarizer was changed to a protective film having in-plane retardation at a wavelength of 550 nm, as listed in Table 1.

Comparative Example 5

A polarizing plate was prepared in the same manner as in Example 1 except that the protective film was changed to a protective film having in-plane retardation at a wavelength of 550 nm as listed in Table 1 without forming an antiglare layer and a low refractivity layer.

The protective films and polarizing plates of the Examples and Comparative Examples were evaluated as to the following properties and results are shown in Table 1 and FIG. 3 to FIG. 12.

Protective Film

1. In-plane retardation (Re, unit: nm, @550 nm): In-plane retardation of the protective film was measured using an in-plane retardation meter (AXOSCAN).

2. Haze (unit: %): Haze was measured using a haze meter (NDH-2000, Nippon Denshoku Co., Ltd.). Total haze was measured on each of the protective films of the Examples and Comparative Examples by NDH-2000. Internal haze was measured by NDH-2000 with respect to a specimen, which was prepared by dropping ethanol on a glass plate having a total haze of 1% or less and bringing the antiglare layer (low refractivity layer, if any) of the protective film into full contact with the glass plate. External haze was calculated by an equation: total haze measured above-internal haze measured above.

Polarizing Plate

3. SCI reflectance (unit: %): After attaching a COP film side of a polarizing plate to a black acryl plate (PH-10), SCI reflectance was measured using a reflectance meter (CM-2600D, Konica Co., Ltd.).

4. Rainbow stain: A polarizing plate was applied to an optical display panel (UN55KS8000F, QLED TV, VA mode, Samsung Electronics Co., Ltd.) and was operated, followed by evaluation of visibility of rainbow stains with the naked eye in a white mode, in which visibility of rainbow stains was evaluated on a scale of 1 to 10. Here, a higher score indicates that more rainbow stains are visible.

5. Luminance on panel (unit: none): A polarizing plate was stacked on a viewer side polarizing plate of an optical display panel (UN55KS8000F, QLED TV, VA mode, Samsung Electronics Co., Ltd.) and was operated, followed by evaluation of luminance in a white mode with a luminance meter (SR3-A).

TABLE 1

Figure 3:
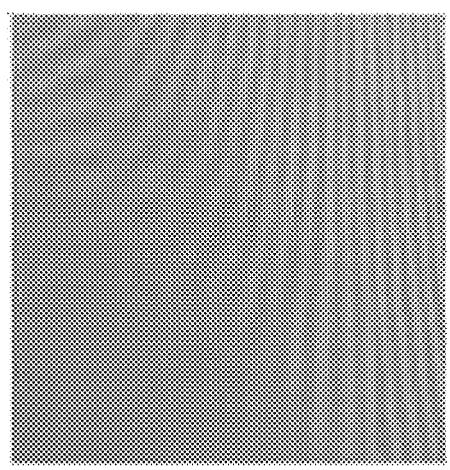
FIG. 3 to FIG. 12 show evaluation results of rainbow stain visibility of examples and comparison examples.
Figure 4:
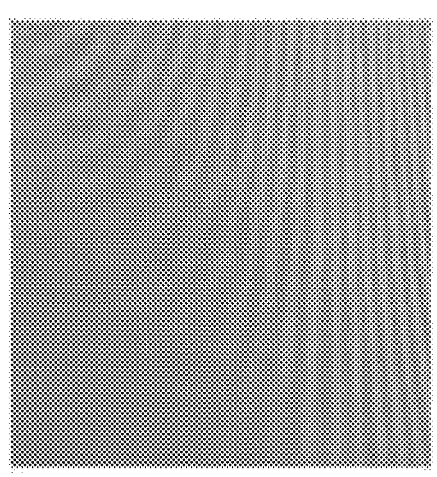
Figure 5:
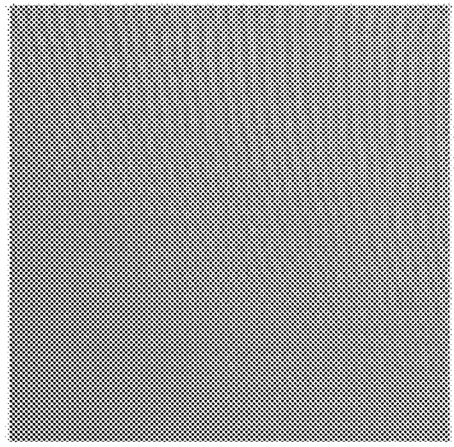
Figure 6:
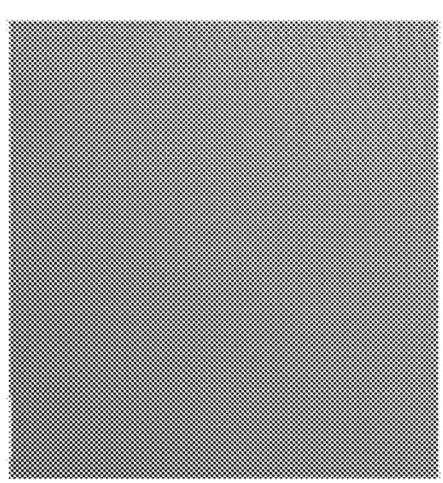
Figure 7:
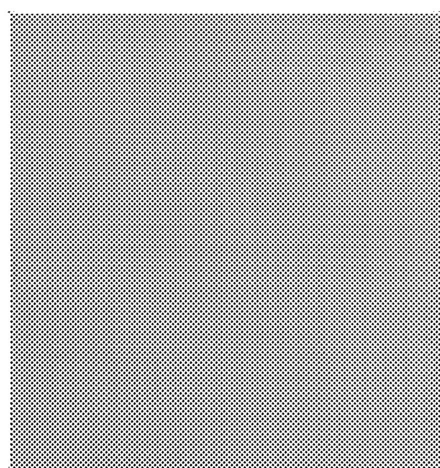
Figure 8:
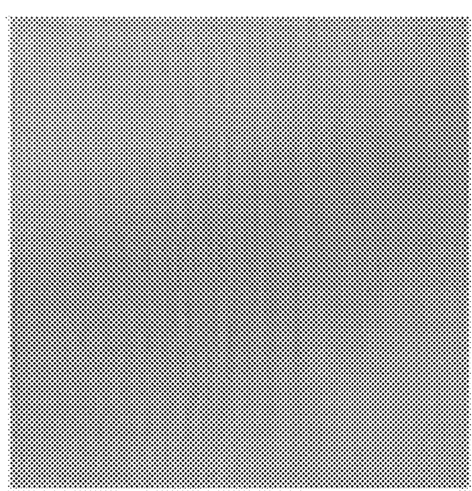
Figure 9:
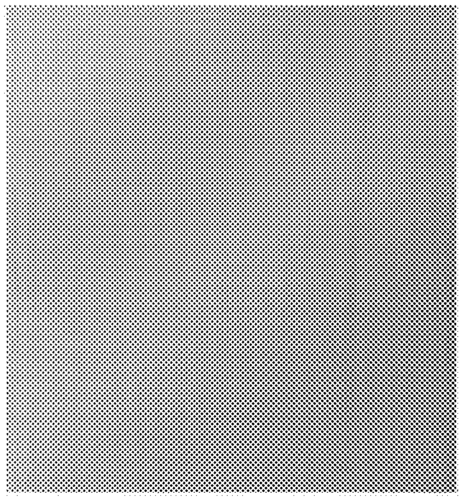
Figure 10:
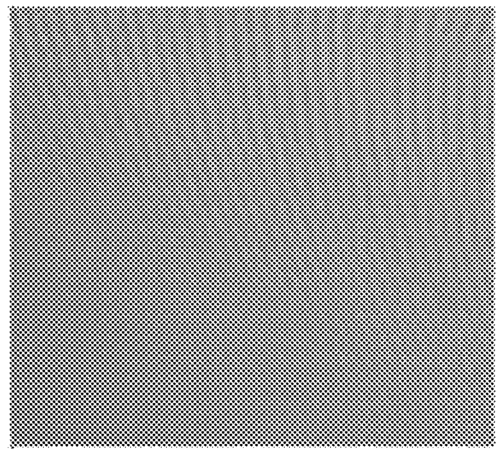
Figure 11:
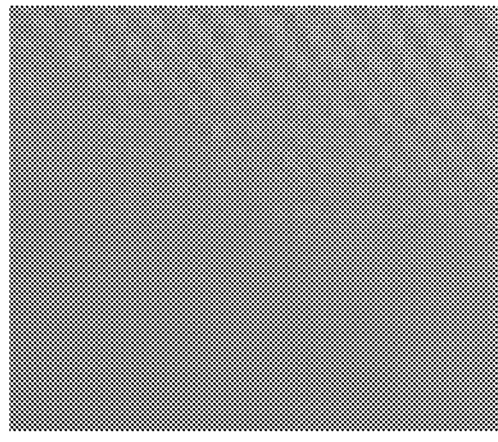
Figure 12:
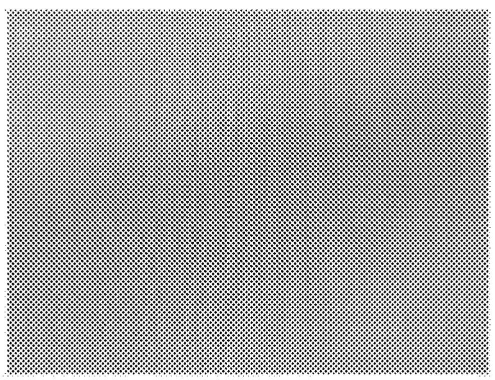

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Protective film | Re | 240 | 2600 | 2600 | 950 | 950 | 2600 | 240 | 950 | 950 | 2600 |
| | Total haze | 42 | 44 | 52 | 58 | 75 | 3 | 35 | 50 | 82 | 1 |
| | External haze | 36 | 42 | 49 | 56 | 70 | 1 | 12 | 19 | 14 | 0.8 |
| | Inner haze | 6 | 2 | 3 | 2 | 5 | 2 | 23 | 31 | 68 | 0.2 |
| | Ratio* | 0.167 | 0.048 | 0.061 | 0.036 | 0.071 | 2.000 | 1.917 | 1.632 | 4.857 | 0.25 |
| | Antiglare layer | Present | Present | Present | Present | Present | Present | Present | Present | Present | Absent |
| | Low refractivity layer | Present | Present | Present | Present | Present | Absent | Present | Present | Present | Absent |
| SCI reflectance | | 1.7 | 2.3 | 2.1 | 1.8 | 2.4 | 4.6 | 1.0 | 1.9 | 1.3 | 3.4 |
| Rainbow stain | Evaluation | FIG. 3 | FIG. 4 | FIG. 5 | FIG. 6 | FIG. 7 | FIG. 8 | FIG. 9 | FIG. 10 | FIG. 11 | FIG. 12 |
| | Score | 4 | 4 | 3 | 2 | 1 | 10 | 8 | 3 | 1 | 10 |
| Luminance | | 251 | 254 | 250 | 256 | 254 | 256 | 231 | 228 | 218 | 259 |

*Ratio: Ratio of internal haze to external haze of protective film.

As shown in Table 1, the polarizing plates according to the present invention achieved rainbow stain improvement and luminance improvement. This result could also be seen in FIG. 3 to FIG. 7. As shown in FIG. 3 to FIG. 7, it could be seen that the polarizing plates according to the present invention rarely showed rainbow stains and exhibited very weak rainbow stains even when viewed.

By contrast, it could be seen that the polarizing plates of the Comparative examples including a protective film not satisfying the total haze and haze ratio of the present invention could not concurrently, or simultaneously, achieve luminance improvement and rainbow stain improvement. The lack of rainbow stain improvement can be seen from FIGS. 8, 9, and 12. As shown in FIGS. 8, 9 and 12, rainbow stains were very strongly visible. As shown in FIG. 10 and FIG. 11, despite very weak rainbow stains, the polarizing plates provide very weak luminance and can be difficult to use, as shown in Table 1.

Although some example embodiments have been described herein, it is to be understood that various modifications, changes, alterations, and equivalent embodiments can be made by those skilled in the art without departing from the spirit and scope of the invention.

What is claimed is:

1. A polarizing plate comprising: a polarizer; and a protective film stacked on a light exit surface of the polarizer, wherein the protective film comprises a polyester based base layer and an antiglare layer stacked on one surface of the polyester based base layer, and wherein the protective film has an in-plane retardation of 100 nm to 4,000 nm at a wavelength of 550 nm, a total haze of 40% to 80%, and a ratio of internal haze to external haze of greater than 0 and less than or equal to 0.2.

2. The polarizing plate as claimed in claim 1, wherein the protective film has an external haze of 20% or more to less than 80%.

3. The polarizing plate as claimed in claim 1, wherein the protective film has an internal haze of 10% or less.

4. The polarizing plate as claimed in claim 1, wherein the protective film has an external haze of 30% to 70% and an internal haze of 1% to 10%.

5. The polarizing plate as claimed in claim 1, wherein the polyester based base layer has an internal haze of 1% or less and an external haze of 1% or less.

6. The polarizing plate as claimed in claim 1, wherein the protective film is biaxially stretched.

7. The polarizing plate as claimed in claim 1, wherein the antiglare layer has irregularities on an outermost surface thereof without beads.

8. The polarizing plate as claimed in claim 1, wherein the antiglare layer comprises beads therein to have irregularities on an outermost surface thereof.

9. The polarizing plate as claimed in claim 8, wherein the antiglare layer comprises a mixture of first organic particles and second organic particles having a smaller average particle diameter (D50) than the first organic particles.

10. The polarizing plate as claimed in claim 1, wherein an in-plane slow axis of the protective film is tilted at an angle of −40° to +40° with respect to a light absorption axis (0°) of the polarizer.

11. The polarizing plate as claimed in claim 1, wherein the protective film further comprises a low refractivity layer stacked on one surface of the antiglare layer.

12. The polarizing plate as claimed in claim 1, further comprising another protective film stacked on a light incidence surface of the polarizer.

13. An optical display apparatus comprising the polarizing plate as claimed in any one of claim 1.

* * * * *